United States Patent [19]
Becker

[11] 3,960,266
[45] June 1, 1976

[54] APPARATUS FOR SIMULTANEOUSLY TRANSFERRING A PLURALITY OF ARTICLES FROM ONE CONVEYOR TO ANOTHER

[75] Inventor: Kurt Becker, Obernkirchen, Germany

[73] Assignee: Hermann Heye, Obernkirchen, Germany

[22] Filed: Mar. 19, 1974

[21] Appl. No.: 452,551

[30] Foreign Application Priority Data
Apr. 3, 1973 Germany.............................. 2316467

[52] U.S. Cl................................ 198/235; 198/24; 198/31 AB; 198/102
[51] Int. Cl.² ..................................... B65G 47/24
[58] Field of Search ............... 198/235, 24, 25, 102, 198/31 R, 31 AA, 31 AB, 31 AC

[56] References Cited
UNITED STATES PATENTS

| | | | |
|---|---|---|---|
| 1,612,215 | 12/1926 | Phelps............................. | 198/31 R |
| 1,629,323 | 5/1927 | Swartz............................. | 198/31 R |
| 2,217,982 | 10/1940 | Heil et al. ....................... | 198/31 R |
| 2,547,791 | 4/1951 | Smith et al..................... | 198/31 AA |
| 2,601,914 | 7/1952 | Davies............................ | 198/31 R |
| 3,184,031 | 5/1965 | Dunlap ........................... | 198/24 |
| 3,550,789 | 12/1970 | Jaeger............................. | 198/31 |
| 3,687,262 | 8/1972 | Campbell....................... | 198/31 AA |

Primary Examiner—Robert J. Spar
Assistant Examiner—James M. Slattery
Attorney, Agent, or Firm—Michael J. Striker

[57] ABSTRACT

A plurality of articles are to be transferred simultaneously from one position in which they travel on a first conveyor in a first direction to another position in which they travel on a second conveyor at a slower speed and in a second direction transversely of the first direction. A pusher bar is provided which extends parallel to the first direction and mounting links pivotally mount the pusher bar for displacement across the first conveyor toward the second conveyor in a direction having one component of movement in the second direction and another superimposed component of movement in the first direction. A crank drive is spaced from the pusher bar and is connected with the same by a connecting rod which is so associated with the mounting links as to include an angle with the latter in all of its positions which it can assume relative to the mounting links when actuated by the crank drive.

10 Claims, 8 Drawing Figures

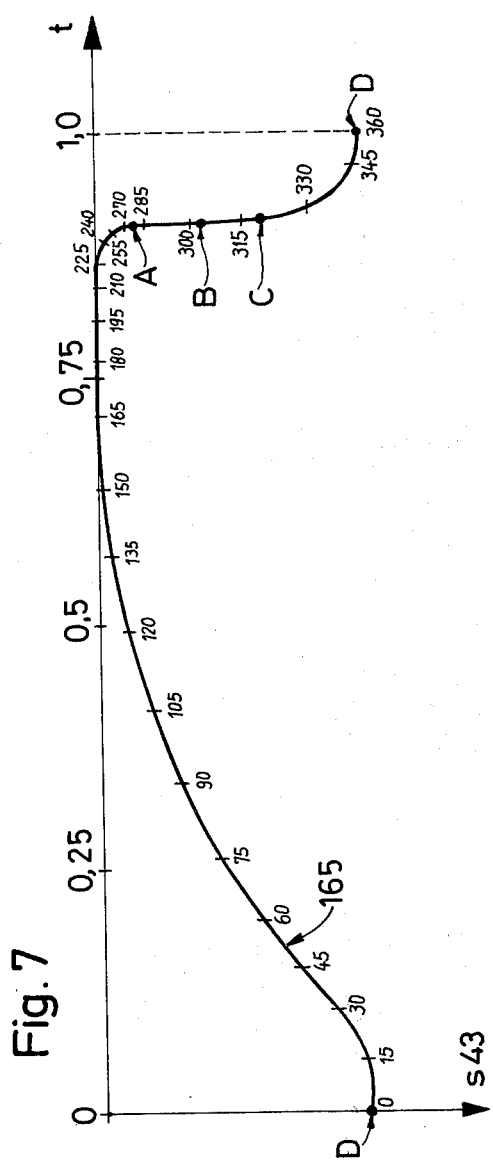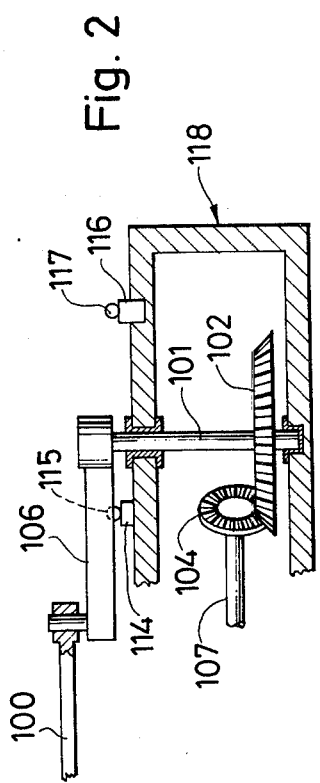

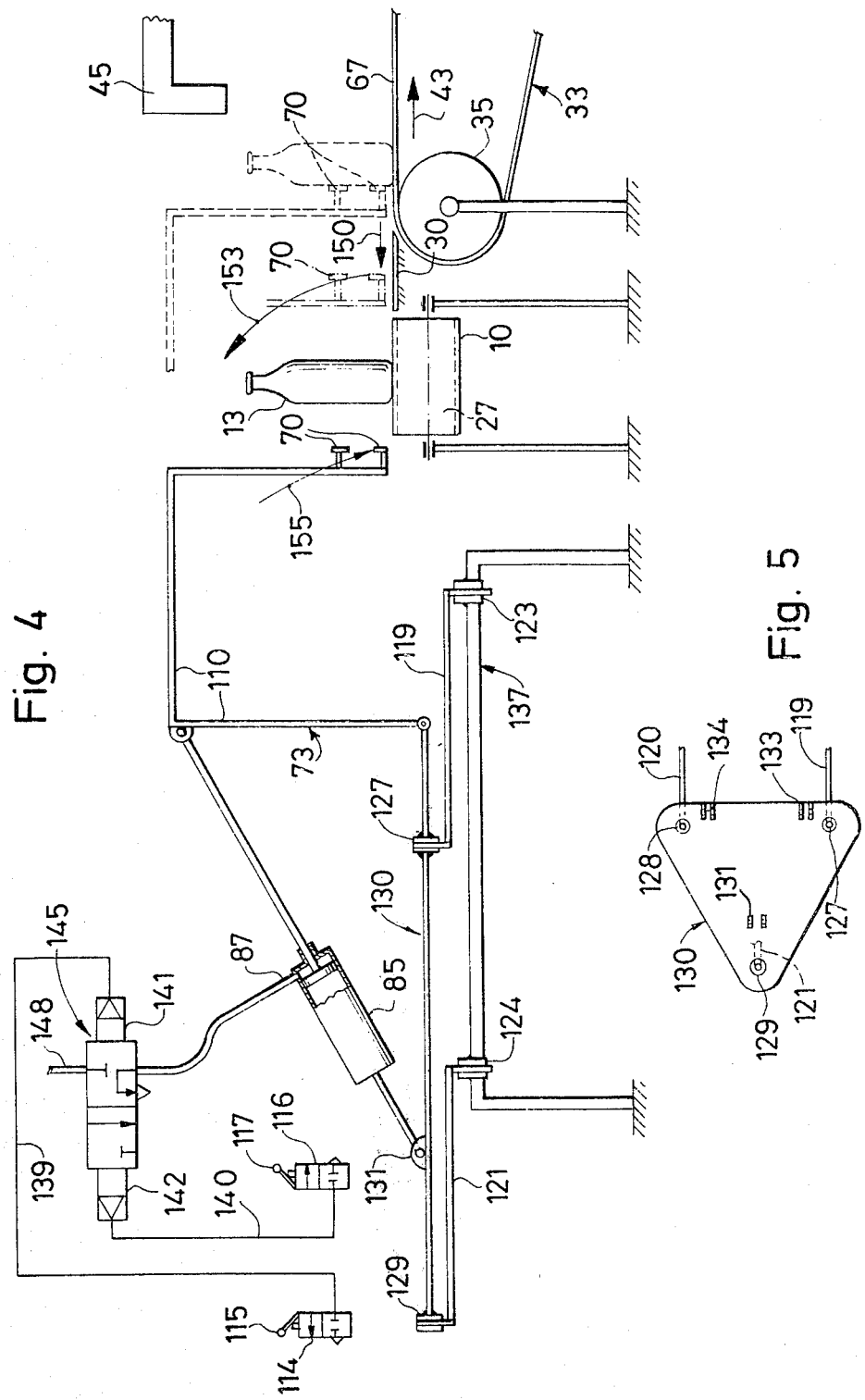

APPARATUS FOR SIMULTANEOUSLY TRANSFERRING A PLURALITY OF ARTICLES FROM ONE CONVEYOR TO ANOTHER

BACKGROUND OF THE INVENTION

The present invention relates generally to an article transfer apparatus, and more particularly to an apparatus for simultaneously transferring a plurality of articles from one conveyor to another. Still more specifically, the invention relates to an apparatus for simultaneously transferring a plurality of articles from one position in which they travel on a first conveyor in a first direction to another position in which they travel on a second conveyor at lower speed in a second direction transversely of the first direction.

In many instances it is necessary to transfer a number of articles simultaneously from one conveyor to another conveyor moving at a different speed and in a different direction from the first conveyor. This is true, for instance, in the case of articles which are made of glass or similar material which can be readily damaged unless handled gently. The necessity for such transfer occurs, for instance, where a large number of glass objects moves along a conveyor from one step in the manufacturing process to another, and requires to be transferred from the first conveyor to a second conveyor which moves at a different speed and in a different direction. Various expedients are employed for effecting this transfer, including manual transfer, transfer by means of deflecting plates, and other possibilities.

It is also known to provide various mechanized transfer devices, but none of these have been found entirely satisfactory. The problem of transfer is particularly bothersome when the glass objects move to the transfer point at one speed and must be transferred to a surface moving at a substantially different speed. The problem is aggravated if glass bottles are involved, especially tall or moderately tall bottles, because bottles are quite unstable which complicates the problem of transferring them without having them fall over or become otherwise disarranged, with a consequent disruption in the orderly flow of bottles and the likelihood that breakage or other damage such as scalding might occur.

The problem is typically encountered in instances where bottles are carried along a relatively narrow conveyor in a single row, for instance arriving from a bottle forming machine, and must then be transferred to a wide conveyor on which it is necessary to arrange the bottles in ranks extending transversely of the elongation of the wide conveyor, and in a considerable number of bottles per rank. It is obvious that the second conveyor can move at only a much slower speed than the single-row conveyor which brings the bottles to the transfer point, and that the transfer under these circumstances will present considerable problems.

Attempts have been made in the prior art to overcome some of these problems, for instance by providing a pusher bar which is pivoted to two cranks which are of identical length, directly driven and which move at constant angular speed. In this case the problem has been encountered that the pusher bar impacts the articles — throughout the description reference will be made to bottles for the sake of convenient explanation — at an undesirably high speed, leading to a displacement of the bottles from their relative positions so that they will not be properly located when they reach the slower travelling second conveyor.

Another attempt has been made in U.S. Pat. No. 2,601,914 which describes a transfer mechanism in which an elongated push bar is actuated by combined rotary and oscillatory components which shift the push bar laterally and longitudinally as it transfers the bottles from the first conveyor to the second conveyor. However, by the nature of this construction the push bar — and hence the bottles being pushed by it — is subjected to varying acceleration during each operating cycle, and in addition at the moment the push bar disengages from the bottles which it has transferred, it moves with maximum speed in the direction of travel of the first conveyor. This makes it impossible to position the bottles precisely on the second conveyor in the desired manner.

U.S. Pat. No. 2,217,982 discloses a receptacle transfer mechanism having a pusher bar that is pivoted to two pivot arms of identical length. The opposite end of each of the pivot arms is in turn pivoted to a continuously turning crank pin. Each of the arms is provided with a longitudinally extending slot which receives a stationary pivot. In this construction the pusher bar will have a component of speed in the direction of movement of the first conveyor which is approximately zero at the moment at which it engages a group of articles that are to be transferred from the first conveyor to the second conveyor. This is disadvantageous because it is now necessary that essentially the full speed differential between the speed of advancement of the articles on the first conveyor and the substantially stationary pusher bar must be compensated by friction between the latter and the articles. From the moment of contact until the moment at which the pusher bar disengages the articles after they have been transferred to the second conveyor, the component of speed of the pusher bar in the direction of advancement of the first conveyor increases until it reaches its maximum value at the moment at which the pusher bar disengages the transferred articles. This means that here also the same disadvantages obtain as were described before. Moreover, although the component of movement of the pusher bar in the direction of movement of the first conveyor is substantially zero at the time the pusher bar contacts the articles to be transferred, its component of movement in the direction of the second conveyor at the time of contact is already substantial so that the articles are quite abruptly accelerated in the direction towards the second conveyor, which is disadvantageous.

Another apparatus for transferring rows of bottles from a single row relatively fast moving conveyor to a wide slower moving second conveyor is disclosed in U.S. patent No. 3,550,789. In this construction a pair of elongated gripping bars is provided which simultaneously grip the tops of the row of bottles from the fast moving conveyor and then swing accurately on parallel arms to the slower moving conveyor where they release the bottles so that the same can form a rank on the second conveyor. The bars are caused to swing tangentially to the row of bottles which is to be picked up, and at the point of tangent the speed of the bars is synchronized with the speed of the feeding conveyor so that the bottles are gripped by the bars. The construction disclosed in this patent is quite complicated and therefore expensive. Moreover, although this apparatus is certainly operable in the desired manner, its very complexity will necessarily make it susceptible to breakdown and similar problems.

Other attempts at providing mechanical apparatus for the same purpose are also known from the prior art, but none of these devices are fully satisfactory either.

SUMMARY OF THE INVENTION

It is, accordingly, a general object of the invention to overcome the disadvantages of the prior art.

More particularly, it is an object of the present invention to provide an apparatus for simultaneously transferring a plurality of articles from a first conveyor to another slower second conveyor travelling in a different direction, which apparatus avoids the disadvantages of the prior art.

A still more particular object of the invention is to provide such an apparatus which is very simple in its construction and highly reliable in its operation.

An additional object of the invention is to provide such an apparatus in which the articles on the first conveyor are engaged by a pusher bar which at the time of engagement has a relatively small speed differential with respect to the articles.

A concomitant object of the invention is to provide such an apparatus in which the pusher bar has a very small speed differential, preferably approaching zero, relative to the articles at the time it disengages from them after transferring them to the second conveyor.

Still another object of the invention is to provide such an apparatus which can be readily accommodated to different operating requirements.

The apparatus according to the present invention is to be capable of transferring the production of modern high-speed glass making machines, which may for instance make on the order of 600 glass articles per minute, from the first or feed conveyor to the second conveyor which may for instance transport the articles to a cooling zone.

In keeping with the above objects, and with others which will become apparent hereafter, one feature of the invention resides in an apparatus for simultaneously transferring a plurality of articles from one position in which they travel on a first conveyor in a first direction to another position in which they travel on a second conveyor at slower speed in a second direction transversely of the first direction. The apparatus comprises a pusher bar extending parallel to the first direction, and mounting means including mounting links which pivotally mount the pusher bar for displacement across the first conveyor toward the second conveyor in a direction having one component of movement in the second direction and another superimposed component of movement in the first direction. A crank drive is spaced from the pusher bar, and connecting rod means is actuated by the crank drive and is so connected with the mounting means as to include an angle with the mounting links in all of its positions relative to the latter.

The apparatus according to the present invention is very simple in its construction, and is very reliable in operation and exhibits very low susceptibility to breakdown. Moreover, the apparatus can readily be varied to accommodate it to different requirements, for instance by changing the relationship of the length of the crank of the crank drive to the length of the connecting rod. It is also possible to vary the length of the mounting links, or to utilize mounting links which are of differential length rather than of identical length. The angular range which can be included between the connecting rod and the mounting links can be varied, to thereby influence the movement characteristics of the pusher bar during an operating cycle of the latter. The mounting links could advantageously be pivotable about respective vertical axes.

In the apparatus according to the present invention the crank drive causes the free end of the connecting rod to travel substantially in a sinus curve upon which the pivoting movement of the mounting links is superimposed to produce the desired two-component movement of the pusher bar. This movement can be readily, simply and inexpensively varied to accommodate it to different requirements, by appropriate selection of the aforementioned parameters, which makes it possible to obtain a significant improvement in the transfer capacity of the apparatus per unit of time. Despite the relative simple drive of the novel apparatus it is possible for the pusher bar to first take along the articles to be transferred, in the direction of movement of the first conveyor, and then to impart to them an increasing movement in the direction of advancement of the second conveyor, thus pushing the articles off the first conveyor and pushing them onto the second conveyor approximately parallel to the direction of movement of the latter.

The construction according to the present invention is particularly advvantageous and simple if the effective length of all of the mounting arms is identical. The crank can turn at constant angular speed, which makes it possible to use a simple and inexpensive conventional crank drive. It is, however, equally possible to use a crank drive in which the crank is turned at non-uniform angular speed to thereby influence the movements of the pusher bar during each operating cycle. Of course, the first and the second conveyor can be synchroneously driven with the crank drive, in which case a change in the travel speeds of the conveyors results in an automatic accommodation of the angular speed of the crank to the changed speeds of the conveyors, and thus in an automatic accommodation of the movement of the pusher bar to the changed circumstances.

According to one advantageous embodiment of the invention the mounting links will extend at least substantially normal or at right angles to the elongation of the pusher bar when the latter is in its starting position, that is in the position before it begins its operating cycle, and the free ends of the mounting links will face away from the first conveyor. With such a construction the pusher bar will begin to move away from its starting position at relatively small acceleration, whereas at the time at which it contacts the articles on the first conveyor greater acceleration can be imparted to it in order to obtain a fast transfer of the articles to the second conveyor.

Similar results can be obtained with a further embodiment of the invention, according to which the mounting links will extend at least substantially at right angles to the direction of movement of the second conveyor in the terminal position which they assume when the transfer of articles from the first conveyor to the second conveyor has been completed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a section taken on line II—II of FIG. 1B;

FIG. 4 is a diagrammatic fragmentary vertical section illustrating a further embodiment of the invention;

FIG. 5 is a top-plan view of a portion of FIG. 4;

FIG. 7 is a graph, showing on hand of a curve the path travelled by the pusher bar during a transfer cycle, in parallelism with the direction of travel of the second conveyor.

DESCRIPTION OF THE PREFERRED EMBODIMENTS

Figure 1A:
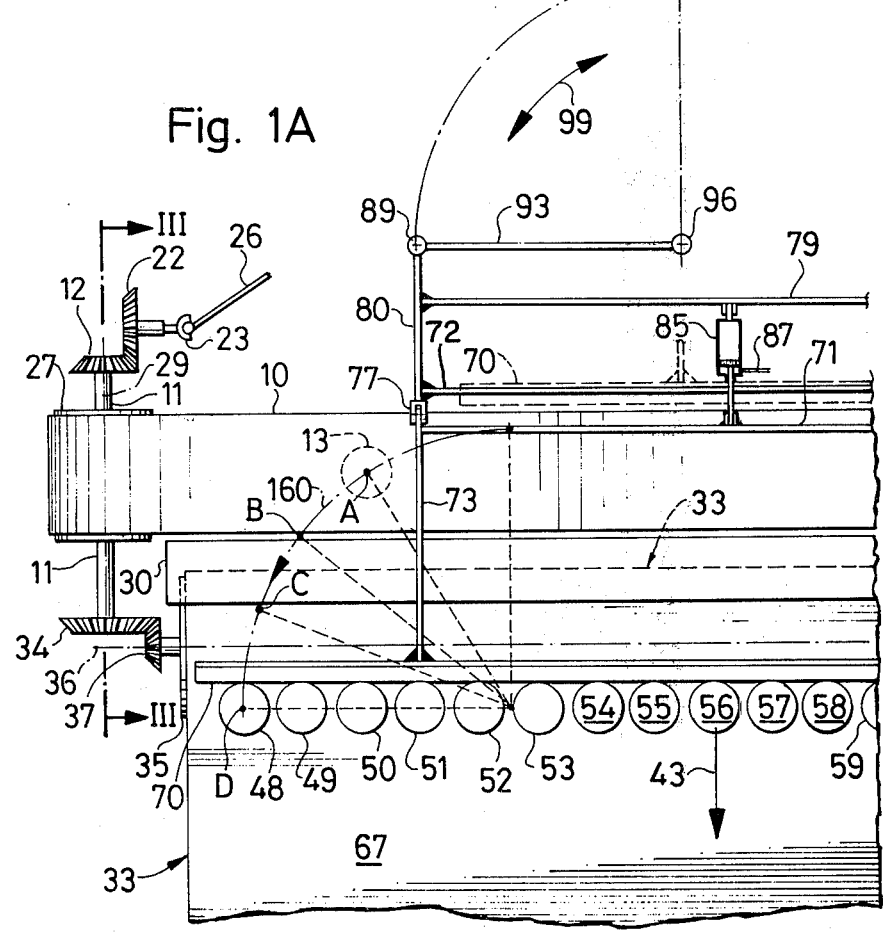
FIGS. 1A and 1B are fragmentary diagrammatic top-plan views showing a first embodiment of the novel apparatus.
Figure 1B:
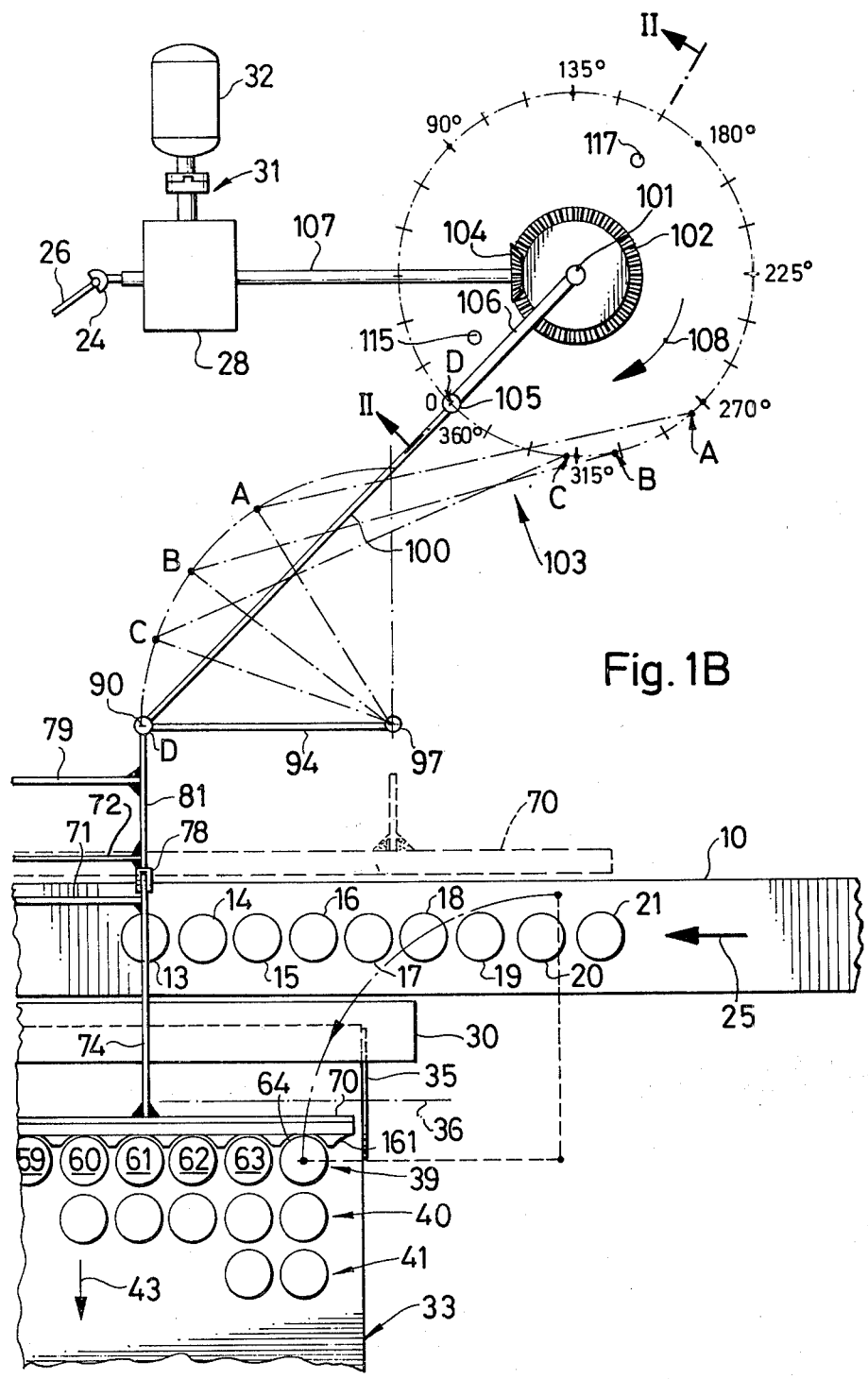

Referring now firstly to FIGS. 1A and 1B it will be seen that reference numeral 10 identifies a first or feeding conveyor 10 on which articles advance in the direction 25 in a row and at equal spacing from one another. For the sake of convenience it will be assumed that the articles, which are identified by way of example with reference numerals 13-21, are glass objects which are derived from a glass-making machine, for instance bottles, jars or the like. At the left-hand side of FIG. 1A it will be seen that the conveyor 10 is trained about a roller 27 which rotates about an axis 29 on a shaft 11. The latter is driven via a pair of bevel gears 12 and 22, a pair of universal joints 23 and 24 (compare FIG. 1B), a coupling rod 26, a gear drive 28 (shown diagrammatically, because completely conventional) and a clutch 31 by a motor 32.

A second conveyor 32, which in this particular embodiment will be assumed to have the purpose of transferring the still hot glass articles to a cooling furnace in which they can be annealed and cooled, extends at right angles to the conveyor 10. A stationary transfer plate 30 is provided which is substantially located in the same plane as the upper stringer of the conveyor 10 and extends along a portion of this upper stringer, overlapping in part the upper stringer of the second conveyor 33. The latter is trained at its end that is shown in FIGS. 1A and 1B about a roller 35 the axis of rotation 36 of which extends parallel to the direction 25 in which the conveyor 10 travels. The roller 35 is driven by the shaft 11 by means of a pair of bevel gears 34 and 37.

Figure 3:
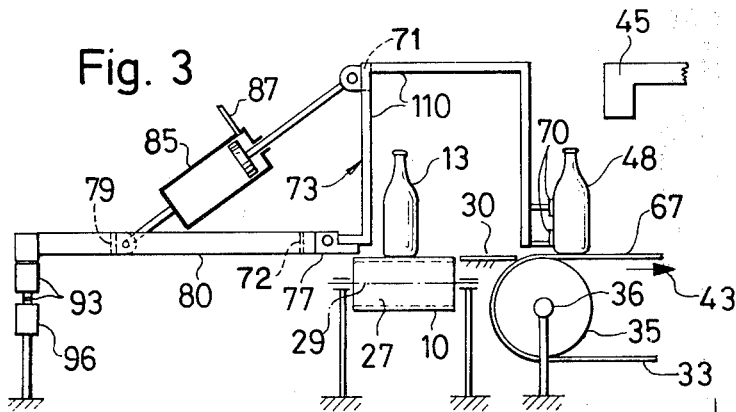
FIG. 3 is a section taken on line III—III of FIG. 1A.

The purpose of the conveyor 33 is to transport ranks of bottles or other objects in the direction 43 into and through the cooling oven 45 (see FIG. 3). By way of example, ranks 39, 40 and 41 have been shown, and it will be assumed that each rank is to be composed of seventeen articles, for instance the articles 48-64 that are shown with respect to the rank 39. The upper stringer 67 of the second conveyor 33 is located essentially in the same plane as the plate 30, as is evident from FIG. 3.

The transfer of the articles from the conveyor 10 to the conveyor 33 is effected by means of a pusher bar 70. The latter is connected to two arms 73 and 74 which are in turn connected with one another by a traverse 71. A pair of further arms 80 and 81 is provided with bifurcated ends 77 and 78; the arms 80 and 81 are connected by traverses 72 and 79 and the arms 73 and 74 are pivotably mounted in the bifurcated ends 77 and 78, respectively. A fluid-operated cylinder and piston unit 85 is pivotably connected with the traverses 71 and 79 and can receive pressure fluid via a conduit 87 in a manner still to be described later.

The arms 80 and 81 are pivoted at 89 and 90, respectively, to links 93 and 94. The latter are each turnable through 90° in stationary pivots 96 and 97, as indicated by the double-headed arrow 99 in FIG. 1A. The free end of a connecting rod 100 of a crank drive 103 is pivotally connected at 90 with the arm 81 and the link 94, respectively, as shown in FIG. 1B. At 105 the connecting rod 100 is pivoted to a crank 106 of the crank drive 103. The crank 106 turns in the direction of the arrow 108 (compare FIG. 1B), being driven via a shaft 101 which in turn is driven by a pair of bevel gears 102, 104 from a shaft 107. The shaft 107 is in turn driven by the gear drive 28, as shown in FIG. 2 and FIG. 1B.

It is important that in operation the arms 73 and 72 should not interfere with articles, such as the articles 13–21, which travel on the conveyor 10. Such interference must be avoided even when the pusher bar 70 has moved across the conveyor 10 from the broken line position (the starting position) to the full-line position (the terminal position) shown in FIGS. 1A and 1B. To avoid this problem the arms 73 and 74, which of course are spaced longitudinally of the pusher bar 70, are bent, for instance as shown in FIG. 1, so as in the illustrated embodiment to have the general configuration of an inverted letter U. When the pusher bar 70 is retracted from the full-line position shown in FIGS. 1A, 1B and 3 to the starting position shown in broken lines in FIGS. 1A and 1B, the arms 73 and 74 which carry the pusher bar 70 are pivoted upwardly by operation of the cylinder and piston unit 85. This prevents the pusher bar 70 from knocking over the articles 13–71 which in the meantime (i.e. while the pusher bar 70 has moved the preceding rank of articles onto the conveyor 33) have moved on the conveyor 10 behind the pusher bar 70. To accomplish this, pressure fluid is admitted into the cylinder and piston unit 85 via the conduit 87 from a non-illustrated source. The control of the fluid supply is effected via a two-way two-position valve 114 that is shown in FIG. 4 and which has a control element 115 (see FIG. 1B) that is operated by the crank 106 during the rotation of the latter (compare also FIG. 2). When the pusher bar 70 has been fully retracted to its brokenline position in FIGS. 1A and 1B, the pressure fluid in the cylinder and piston unit 85 is permitted to escape via the conduit 87, for which purpose a second two way-two position valve 116 is provided, having a control element 117 which is also operable by engagement with the crank 106, as the latter turns. Further details of a control arrangement for this purpose will be described with reference to the embodiment in FIG. 4, since the arrangement shown in FIG. 4 is also applicable in the embodiment of FIGS. 1-3. The valves 114 and 116 are mounted in a frame or support 118, which also mounts the shaft 101.

Coming now to the embodiment in FIGS. 4 and 5, wherein like reference numerals identify like elements as in the preceding embodiment, it will be seen that here there are provided three arms 119, 120 and 121 for each of the arms 73 and 74 (only 73 is shown).

These arms 119–121 are mounted in journals 123 and 124. Bearing sleeves 127, 128 and 129 connect a pivotable plate 130 to the free ends of the arms 119–121, and the one end of the cylinder and piston unit 85 is pivoted at 131 to the plate 130, as shown in FIG. 5. Also pivoted to the plate 130, namely at 133 and 134, are the arms 73 and 74 (compare again FIG. 5). A frame 137 carries the journals 123 and 124.

The valves 114 and 116 are shown in FIG. 4 to be connected via control conduits 139 and 140 with indirect control valves 141 and 142 of a three way-two position valve 145. This is a negatively controlled impulse valve which receives pressure fluid via a conduit 148 and is connected with the conduit 87 leading to the cylinder and piston unit 85.

In operation of the embodiments of FIGS. 1–3 and 4, respectively, and assuming that the pusher bar 70 is in the terminal position in which it has just transferred a rank 39 of articles 48–64 onto the conveyor 33 behind the already previously deposited rank 40, the connecting rod 100 and the crank 106 are in a position of axial alignment, whereas the links 93 and 94 extend at right angles to the direction of advancement 43 of the conveyor 33.

It is evident that in this position the pusher bar 70 must not immediately be pivoted upwardly (in counterclockwise direction in FIG. 4) by operation of the unit 85. If this were done, then the danger would obviously exist that the pusher bar 70 might knock over the articles of the rank 39 and possibly also articles of the rank 40 or even the rank 41. To avoid this, the operating member 115 has been so positioned that it will be engaged only after the crank 106 has moved approximately 15° past the position shown in FIG. 1B in which the crank 106 is in axial alignment with the connecting rod 100. Assuming that the crank turns at uniform angular speed, this means that the pusher bar 70 will first be retracted from its terminal position (which is shown in broken lines in FIG. 4 but which corresponds to the full-line position in FIGS. 1A and 1B) in the direction of the arrow 150 to the second (left-hand) broken-line position of FIG. 4, without being raised. Only when it reaches the second broken-line position in FIG. 4 will the pusher bar 70 be lifted and pivoted in counterclockwise direction as indicated by the arrow 153, by pivoting of the arms 73 and 74 via operation of the cylinder and piston unit 85. Since the pusher bar 70 at this time is retracted from the rank 39, it cannot knock over any of the articles of that rank or of the ranks 40, 41. At the same time, it will clear the articles (for instance 13–21 in FIG. 4) which in the meantime have moved behind it on the conveyor 10. When the pusher bar 70 has been almost completely retracted, the switching element 117 is operated, again by engagement with the crank 106 during the further rotation of the latter, whereupon the weight of the arms 73, 74 and of the pusher bar 70 is allowed to pivot them in clockwise direction, as indicated by the arrow 155 in FIG. 4, so that the pusher bar 70 will return to the full-line position of FIG. 4 which corresponds to its starting position that is shown in broken lines in FIGS. 1A and 1B.

What has been described thus far is only the retraction of the pusher bar 70 from its terminal position to its starting position. The apparatus is now ready for the next transfer cycle. As this begins the pusher bar 70 moves with its arms 73, 74; 80, 81 in a quarter circle which is shown in FIG. 1 and designated with reference numeral 160. At this time the first one of the articles which had previously moved behind the pusher bar, namely the article 13, will have reached the position shown in broken lines in FIG. 1A, by the time it is first contacted by the advancing pusher bar 70. The point of contact is designated with reference character A in FIG. 1A. The next point of importance on the quarter circle which is performed by each of the articles, and which has been shown by way of example for the article 13 in FIG. 1A, is the point B at which the article 13 (and all other articles of the same row which have not been illustrated for the sake of clarity in FIG. 1A) is pushed from the first conveyor 10 onto the stationary plate 30. The next point of importance is the point C which is also located on the quarter circle 160 and at which each of the articles (such as the article 13) is transferred from the plate 30 onto the conveyor 33. Finally, there is the point D which represents the final position assumed by the article 13 on the conveyor 33, that is the position which the article 13 will assume at the time at which the pusher bar 70 begins to retract. It will be appreciated that the exact quarter circle 160 will ordinarily not be indicative of the precise path travelled by each of the articles during transfer from the conveyor 10 to the conveyor 33; the path will actually be influenced by various considerations, such as friction, but since any deviation from the exact quarter circle movement will be identically the same for all articles which are being transferred simultaneously, this is of no consequence. In addition, the pusher bar 70 could of course be provided with recesses 161 in each of which one of the articles would be engaged, in which case the guidance of the articles during their transfer would be more precise.

What is important according to the present invention is that the transfer of the articles from the conveyor 10 to the conveyor 33 should be gentle, that is no damage should occur to the articles, and it should be rapid, that is the articles should be rapidly transferred from point A to point D in FIG. 1A. Moreover, it is desired that the articles should move parallel to the direction 43 in which the conveyor 33 advances, shortly before they reach the point D. How this is achieved in the apparatus according to the present invention will be described with reference to FIGS. 6 and 7 in which the points A, B, C and D have been entered for purposes of orientation and which furnish an explanation about details of the movements of the pusher bar 70 during an operating cycle.

Figure 6:
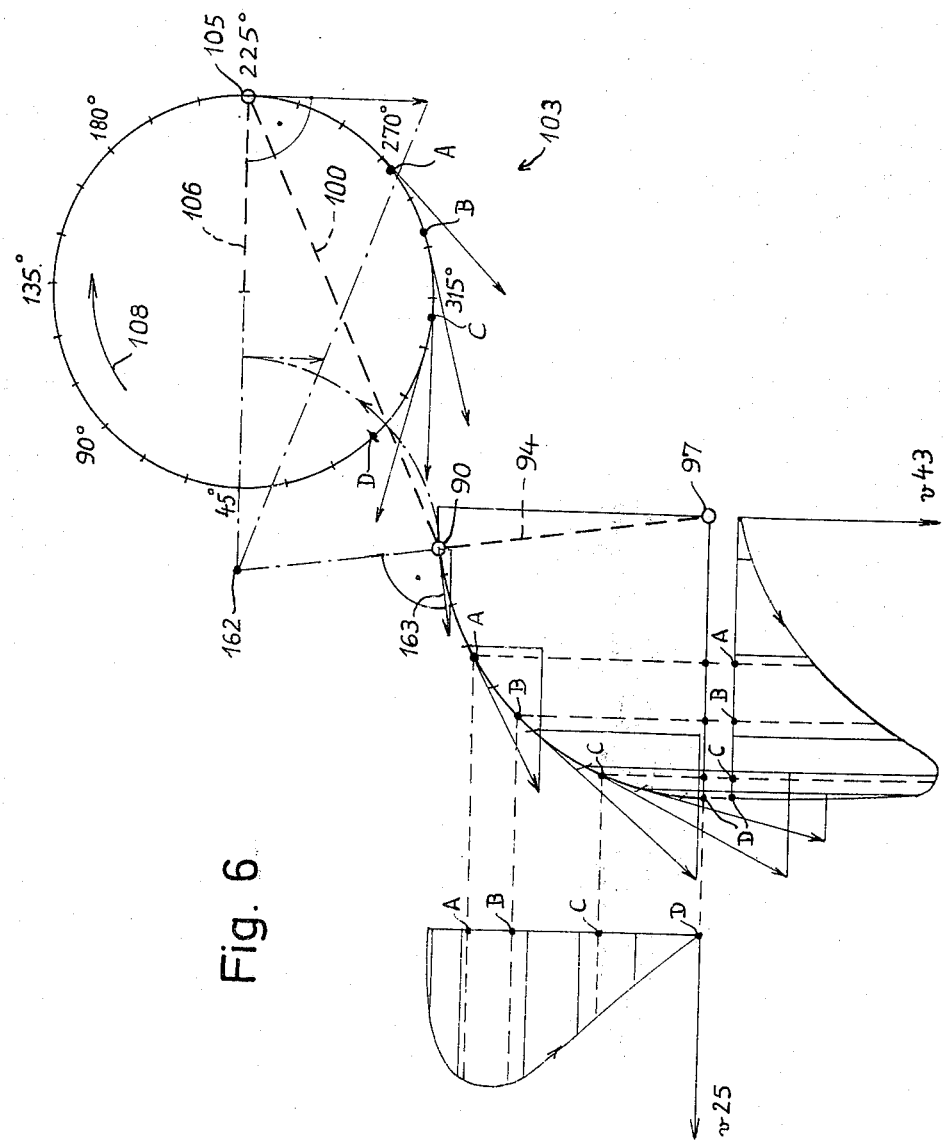
FIG. 6 is a graph, illustrating the different speeds and component of movements of the pusher bar during the movement of the same from its starting position to its terminal position at which it has completed transfer of a series of articles to the second conveyor.

In FIG. 6 it is assumed that the crank 106 will turn at a uniform rate in the direction of the arrow 108. Based upon this, FIG. 6 shows the speed of displacement of the pivot 90 at which the connecting rod 100 is connected with the link 94 and the arm 81; hence, this indicates the speed of displacement of the pusher bar 70 during its movement from starting position to terminal position. The speeds have been shown as vectors of instantaneous speed which are tengential to the quarter circle 160; they were shown on the basis of the instantaneous-pole method. The manner in which the vectors are derived has been shown by way of example in broken lines with respect to the 225 position of the crank drive 103 and the arm 94 in FIG. 6. It will be seen that an instaneous pole 162 was obtained as the point of intersection between the two normal lines on the tangent at the 225° point 105 and on the tangent in the associated point 90 of the quarter circle 160; the associated speed vector 163 is shown at the point 90 tangentially to the quarter circle 160. At the quarter circle 160 these speed vectors are vectorially subdivided into a component v25 indicating the movement of the pusher bar 70 in the direction 25 of the conveyor 10, and a component v43 indicating a movement at right angles to the component v25 and representing the movement of the pusher bar 70 in the direction 43 in which the conveyor 33 travels. The vector diagram v25 shows that the highest values v25 are essentially in the range between points A and B, which is desirable as long as the articles 13, etc. are still on the first conveyor 10. The value v25 decreases rapidly from point B towards point D, until it reaches zero at point D.

Vector diagram v43 shows that the value v43 increases only slightly between points A and B, meaning that the articles 13, etc. are accelerated only slowly in the transverse direction of the first conveyor 10 and that the articles are therefore treated gently. The value v43 increases substantially from point B to point C, and then drops rather rapidly to zero from point C to point D. This characteristic is also desirable and results in higher transfer capabilities.

FIG. 7 shows the total distance s43 which is travelled per unit time t by the pusher bar 70 during a complete operating cycle, first in the direction counter to and subsequently in the same direction as the advancement - direction 43 of the conveyor 33. The curve 165 which is plotted in FIG. 7 has superimposed upon it for more ready comparison the angular degrees of the circle in which the crank 106 turns, and which are also shown in FIG. 1B. It will be seen how the pusher bar 70 first travels from point D (corresponding to the terminal position) towards point A, that is until it reaches its starting position. The advancing phase of the cycle, that is the movement of the pusher bar 70 from its starting position towards its next terminal position, begins only at approximately 180°, that is after three-quarters of the total cycle time has already elapsed. This means that only one-quarter of the cycle time is required for the pusher bar 70 to push a row of articles from the conveyor onto the conveyor 33. Since the points A, B, C and D are also shown on curve 165 of FIG. 7, it is quite evident from a comparison of their location on the curve that the actual transfer of articles from the conveyor 10 onto the conveyor 33 takes place during the steepest part of the curve 165, and thus is accomplished in that part of the curve having the most advantageous speed vector v43.

Thus, the apparatus according to the present invention achieves its intended purposes and avoids the disadvantages of the prior art, providing for a rapid transfer of articles from one conveyor to a slower-moving second conveyor which travels substantially at right angles to the first conveyor, without in any way causing damage to the articles or causing their displacement relative to one another during or as a result of the transfer.

It will be understood that each of the elements described above, or two or more together, may also find a useful application in other types of constructions differing from the types described above.

While the invention has been illustrated and described as embodied in an apparatus for simultaneously transferring a plurality of articles from one conveyor to a slower-moving second conveyor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An apparatus for simultaneously transferring a plurality of articles from one position in which they travel on a first conveyor is a first direction to another position in which they travel on a second conveyor at a slower speed in a second direction transversely of said first direction, said apparatus comprising a frame; pusher means including an elongated pusher bar extending parallel to said first direction; mounting means, including mounting links spaced from each other in siad first direction and each having a first portion pivotally connected to said pusher means and a second portion spaced from said first portion and directly pivotally connected to said frame, said mounting links being operative for pivotally mounting said pusher means on said frame for displacement across said first conveyor toward said second conveyor in a direction having one component of movement in said second direction and another superimposed component of movement in said first direction; a crank drive mounted on said frame and spaced from said pusher means; and connecting means including a connecting rod actuated by said crank drive and so connected with one of said mounting and pusher means as to include an angle with said mounting links in all of its positions relative to the latter.

2. An apparatus as defined in claim 1, wherein said mounting links having first ends connected with said pusher means and second ends spaced from the same, said links extending substantially at right angles to the elongation of said pusher bar prior to commencement of the displacement of the same.

3. An apparatus as defined in claim 1, wherein said pusher means is movable between a starting position which it assumes prior to commencement of its displacement in said direction, and a terminal position which it assumes upon completion of its displacement in said direction; and wherein said pusher means includes arms having first ends connected with said pusher bar and second ends remote from the same and pivoted to said links, said arms extending transversely of the elongation of said pusher bar and said links extending substantially at right angles to said arms when said pusher bar is in said terminal position.

4. An apparatus for simultaneously transferring a plurality of articles from one position in which they travel on a first conveyor in a first direction to another position in which they travel on a second conveyor at a slower speed in a second direction transversely of said first direction, said apparatus comprising a pusher bar extending parallel to said first direction; mounting means, including first mounting arms connected to said pusher bar, second mounting arms pivoted to said first mounting arms, and mounting links pivotably mounting said second arms for displacement across said first conveyor toward said second conveyor in a direction having one component of movement in said second direction and another superimposed component of movement in said first direction; a crank drive spaced from said pusher bar; connecting rod means actuated by said crank drive and so connected with said mounting means as to include an angle with said mounting links in all of its positions with respect to the latter; and actuating means for periodically pivoting said first mounting arms and said pusher bar with reference to said second mounting arms.

5. An apparatus as defined in claim 4, wherein said actuating means is connected between said first and second mounting arms.

6. An apparatus as defined in claim 4, wherein said pusher bar is movable between a starting position which it assumes prior to commencement of its displacement in said direction, and a terminal position which it assumes upon completion of said displacement in said direction; and wherein said first mounting arms are shaped so as to straddle said first conveyor when said pusher bar is in said terminal position and not to interfere with articles travelling on said first conveyor.

7. An apparatus as defined in claim 6, wherein said first mounting arms are of inverted U-shaped, configuration and each has one upright portion closer to and another upright portion farther from said second conveyor, said pusher bar being connected to said first mentioned portions of said first mounting arms and carried by the same, and said oother portion being pivotally connected to said second mounting arms.

8. An apparatus as defined in claim 7, wherein at least two of said first mounting arms are provided, being spaced from one another longitudinally of said pusher bar, said other portions having lower ends which are pivoted to said second mounting arms and also having upper ends; further comprising connecting means connecting said upper ends with one another; and wherein said actuating means comprises a fluid-operated cylinder and piston unit connected to said connecting means and to said second mounting arms, respectively.

9. An apparatus as defined in claim 8, wherein said second mounting arms are substantially located at the level of said lower ends.

10. An apparatus as defined in claim 8; and further comprising an operative connection between said crank drive and said cylinder and piston unit for periodically operating the latter in dependence upon the operation of the former.

* * * * *